(12) United States Patent
Navarro Velasco

(10) Patent No.: US 10,375,895 B2
(45) Date of Patent: Aug. 13, 2019

(54) MACHINE FOR CUTTING THE TIPS OF THE LEAVES OFF AGAVE PLANTS AND PREPARING THE PLANTS FOR THE REMOVAL OF THE CORE

(71) Applicant: Ruben Navarro Velasco, Guadalajara (MX)

(72) Inventor: Ruben Navarro Velasco, Guadalajara (MX)

( * ) Notice: Subject to any disclaimer, the term of this patent is extended or adjusted under 35 U.S.C. 154(b) by 953 days.

(21) Appl. No.: 14/786,469

(22) PCT Filed: Apr. 23, 2014

(86) PCT No.: PCT/MX2014/000061
§ 371 (c)(1),
(2) Date: Oct. 22, 2015

(87) PCT Pub. No.: WO2014/175719
PCT Pub. Date: Oct. 30, 2014

(65) Prior Publication Data
US 2016/0057939 A1 Mar. 3, 2016

(30) Foreign Application Priority Data

Apr. 24, 2013 (MX) .................. MX/A/2013/004605

(51) Int. Cl.
*A01G 3/00* (2006.01)
*A01G 5/00* (2006.01)

(52) U.S. Cl.
CPC .......... *A01G 3/00* (2013.01); *A01G 2005/005* (2013.01)

(58) Field of Classification Search
CPC ...... A01G 3/00; A01G 3/02; A01G 2003/023; A01G 3/033; A01B 41/00; A01B 41/02; A01B 41/04

(Continued)

(56) References Cited

U.S. PATENT DOCUMENTS 5,503,201 A * 4/1996 Strickland ............ A01G 23/089
144/339
6,286,605 B1 * 9/2001 Landeis ................... A01G 3/00
171/50

(Continued)

FOREIGN PATENT DOCUMENTS

MX         01000029         5/2003

OTHER PUBLICATIONS

International Search Report for PCT/MX2014/000061, English translation attached to original, Both completed by the Mexican Patent Office dated Sep. 30, 2014, All together 5 Pages.

*Primary Examiner* — Monica L Williams
*Assistant Examiner* — Aaron M Rodziwicz
(74) *Attorney, Agent, or Firm* — Brooks Kushman P.C.

(57) ABSTRACT

A machine for cutting the tips of the leaves off agave plants to prepare the plants for the subsequent removal of the core. The machine includes a chassis defining a platform having: a rear end having a structural frame supporting arms that project rearwards, wheel rims that rest on the ground being secured to said arms; a front end having a structural frame having arms extending frontwards, a tractor-coupled drawbar being secured to said arms; and an arm that connects to the power take-off and is secured in the upper part of the structural frame. The machine includes a supporting base which can slide under the action of hydraulic elements, and is mounted on a pair of parallel rails and is arranged transversely across the platform. Additionally, the machine includes a hydraulic system with control inputs, actuated by the operator.

10 Claims, 16 Drawing Sheets

(58) Field of Classification Search
USPC .......................................................... 47/1.43
See application file for complete search history.

(56) References Cited

U.S. PATENT DOCUMENTS

| | | | | |
|---|---|---|---|---|
| 6,439,279 | B1* | 8/2002 | Underwood | A01G 23/091 |
| | | | | 144/336 |
| 8,561,325 | B1* | 10/2013 | Hegener | A01G 23/06 |
| | | | | 254/132 |
| 9,288,949 | B1* | 3/2016 | Basinger | A01G 23/06 |
| 9,326,459 | B2* | 5/2016 | Deze | A01G 3/08 |
| 9,470,015 | B2* | 10/2016 | Hull | A01G 17/16 |
| 9,781,885 | B2* | 10/2017 | Niekamp | A01G 23/065 |
| 2003/0217784 | A1* | 11/2003 | Gengler | A01G 23/091 |
| | | | | 144/34.1 |
| 2010/0313431 | A1* | 12/2010 | Nirmel | A01G 3/00 |
| | | | | 30/278 |

* cited by examiner

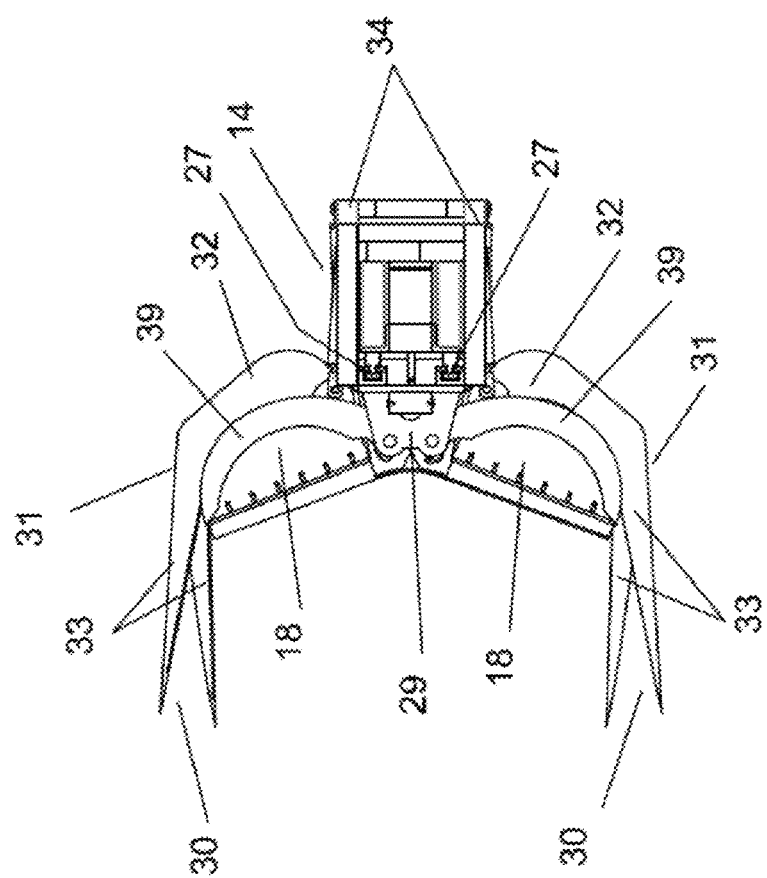

MACHINE FOR CUTTING THE TIPS OF THE LEAVES OFF AGAVE PLANTS AND PREPARING THE PLANTS FOR THE REMOVAL OF THE CORE

CROSS-REFERENCE TO RELATED APPLICATION

This application is the U.S. national phase of PCT Application No. PCT/MX 2014/000061filed on Apr. 23, 2014, which claims priority to MX Patent Application No. MX/a/2013/004605files on Apr. 24, 2013,the disclosure of which are incorporated in their entirety by reference herein.

FIELD OF THE INVENTION

The present invention relates to agriculture in general and in particular relates to the agricultural equipment, machines and implements mounted on or coupled to tractors in order to perform cultivation tasks. More specifically, the present invention relates to a novel agricultural machine for cutting the tips off the leafstalks of agave plants and preparing the plants for subsequent core removal.

BACKGROUND OF THE INVENTION

Everyone is aware that tequila is obtained from the blue agave (*Agave tequilana*) by means of the fermentation and distillation of the extracted sap.

The blue agave (*Agave tequilana*) is a perennial plant of arid zones. Physically, it is formed by thin, almost flat leafstalks. The most important elements that form the plant are the fibers, sugars, mineral salts and water. Around the core of the agave are the leafstalks, which are the stems of the leaves. The natural sap accumulates in the center of the heart and has a high fructose content and a high content of other vitamins in addition to fatty particles that give it its distinctive flavor and smell.

Under optimum conditions of maturity of the plant, it has a high sugar content, which is a basic ingredient for producing tequila and other agave-derived products.

After the agave has reached full maturity, core removal takes place, this being the term given to the action of obtaining the agave heart, since only the central part, commonly known as the plant core, heart or head, of the agave is used, which part will hereinafter be called the heart, where the greater quantity of sugars is concentrated.

In the course of core removal, the agave is cut by a core remover, who is a skilled person essential to the production of tequila, since it is on his knowledge that the quality of the distillates often depends. The core remover uses different tools, each with a precise role to play in the work that culminates in the extraction of the hearts, which is the raw material from which tequila will be prepared. In the course of core removal, the tool known as the "coa" is used, this tool being a long handle with an extremely sharp semicircular tip for cutting and removing the agave leaves or leafstalks, leaving only the pithy interior, which is removed from the soil, with the root being removed in order to leave the heart. Depending on age, on the type of agave and on the form of the cut, the heart may weigh as much as one hundred or more kilos. Agave hearts are gathered and transported to distilleries.

However, the core-removal task is a time-consuming, meticulous and wearisome operation for the core remover, resulting in low production, increased time required for harvesting the hearts, higher production costs, the need for more manpower, etc., which restricts the capacity for production of tequila and other agave derivatives required by industry.

Given the aforesaid, a machine that enables this task to be carried out would solve the above-mentioned problems and drawbacks in said task.

A prior art search revealed Mexican patent MX 243917 by Emil Georg Hoell et al., the proprietor of which is the Center for Research and Assistance in Technology and Design, Jalisco State, A. C., which was filed on Nov. 15, 2001, and granted on Dec. 26, 2006, and which protects an agave harvesting and core-removal machine basically comprising 3 principal elements, namely a fork, an inclined conveyor with mechanically articulated drivers, and a rotating drum with blades that may be coupled to a conventional tractor or form part of a standalone vehicle. Wherein the fork which is formed by two horizontal arms ending in a tip, which for the functioning thereof are joined to the opposite end by means of a supporting base. Between the arms and the base is the cutting element, which may be formed by fixed blades, a band saw, shears or a disk with blades. The lower part of the fork sliding on the ground is provided with a wear plate. This entire element is coupled to the tractor by means of the adapter.

The inclined chain conveyor is provided with mechanically articulated drivers, which are of comb type in order that they may be aligned with the chains on their return, adopting different positions along the length thereof. The position of these drivers is determined by the pivot that slides on a guide along the path of the chains, which are actuated by means of sprockets driven by a hydraulic motor.

The harvester further comprises a squirrel-cage-type drum, a set of fixed cutters mounted on a helical structure traversing the interior body of the drum and another drum set. The rotating drum, together with the elements thereof, is installed inside, supported by wheels secured to the structure on which the drum rotates. These structures may be inclined in a range of from 15 to 45 degrees, allowing a change in the residence time required for the agave inside the rotating drum in order to obtain the desired core-removal results. The drum has an independent power system. Wherein all the elements are on a trailer coupled to the tractor.

However, said machine is a complex machine that operates such that the fork has to run level with the ground, causing the agave plants to pass between the horizontal arms ending in a tip and at the joining end of said arms there are cutting blades, i.e. cutting takes place by exerting pressure as the machine advances. A lower wear plate is needed since the fork has to run by dragging over the soil. As the agave plant is cut at the base it has to be carried by the conveyor in order to convey the agave plant and to deposit it inside the cage-type drum that has cutters that cut the leaves or leafstalks of the agave plant. This furthermore represents an obstruction problem, since the leafstalks or leaves that are cut have to exit via the openings in the drum that comprises rings, leaving small grooves that prevent satisfactory exit of the leafstalks of the agave, which renders core removal problematic.

The technical modernization of the agricultural sector requires the development and innovation of new machinery and equipment that makes it possible to solve significant technical problems within the sector, which translates into greater profitability and, above all, greater productivity and agricultural production of various crops, and higher profitability in the industry that utilizes agricultural produce.

The need for a practical machine that, on the one hand, allows the leafstalks of the agave plants to be cut off and the plants prepared for core removal with another machine is more than obvious, given the problem of implementing this practice manually using the traditional core-removal method.

The present invention offers a machine that makes it possible to perform this operation in a rapid, practical and functional manner, undoubtedly offering technical advantages in the agricultural sector and also in the industrial sector that processes the agave plant.

OBJECTIVES OF THE INVENTION

The principal objective of the present invention is to offer a machine for cutting the tips off the leafstalks of agave plants and preparing the plants for subsequent core removal, which makes it possible to reduce the work and time involved in harvesting the agave and the benefit is the technological contribution to this sector of the field.

A further objective of the invention is to provide said machine for cutting the tips off the leafstalks of agave plants and preparing the plants for subsequent core removal, which machine is, furthermore, compact and of simple, practical and functional structure.

A further objective of the invention is to provide said machine for cutting the tips off the leafstalks of agave plants and preparing the plants for subsequent core removal, which machine may, furthermore, be operated easily by one operator.

A further objective of the invention is to provide said machine for cutting the tips off the leafstalks of agave plants and preparing the plants for subsequent core removal, which machine is, furthermore, structurally suitable, safe and efficient and may be mounted onto and removed from a tractor with ease.

A further objective of the invention is to provide said machine for cutting the tips off the leafstalks of agave plants and preparing the plants for subsequent core removal, which machine, furthermore, considerably reduces the costs of production and allows an increase in production and productivity in the industry processing said crop using this technology.

A further objective of the invention is to provide said machine for cutting the tips off the leafstalks of agave plants and preparing the plants for subsequent core removal, which machine may, furthermore, be easily transported to land under cultivation and to areas where the machine is kept.

A further objective of the invention is to provide said machine for cutting the tips off the leafstalks of agave plants and preparing the plants for subsequent core removal, which machine, furthermore, comprises means for adjusting the height of the cutting elements as a function of the height of the plants and the land conditions.

A further objective of the invention is to provide said machine for cutting the tips off the leafstalks of agave plants and preparing the plants for subsequent core removal, which machine, furthermore, reduces the work for the laborer, the latter performing the most difficult part of the process of core removal, in order that the producer is able to reduce harvesting times and costs.

A further objective of the invention is to provide said machine for cutting the tips off the leafstalks of agave plants and preparing the plants for subsequent core removal, which machine is, furthermore, easy to manufacture and relatively affordable for agricultural producers.

A further objective of the invention is to provide said machine for cutting the tips off the leafstalks of agave plants and preparing the plants for subsequent core removal, which machine, furthermore, prevents accidents that commonly arise when core removal is performed manually.

Moreover, all the aforesaid qualities and objectives that will become apparent upon giving a general and detailed description of the present invention, based on the illustrated embodiments.

BRIEF DESCRIPTION OF THE INVENTION

In order to be able to develop the present invention, which comprises a machine for cutting the tips off the leafstalks of agave plants and preparing the plants for subsequent core removal, problems involving the mechanisms that activate the various parts of the machine were solved, e.g. the turning system, the system of clamps for securing the plant, the system of linear movements on three axes, the mechanisms for cutting the plant, the types of materials and the strength thereof, the dimensions of mechanisms, the calculation of forces for systems for activating the machine, these being some of the problems that were reviewed when designing the machine. In order to achieve all the aforesaid, the characteristics of the plant and of the land were investigated, in an attempt to standardize characteristics in order to seek the best possible result for the machine.

Generally, the machine for cutting the tips off the leafstalks of agave plants and preparing the plants for subsequent core removal, in accordance with the present invention, comprises a chassis defining a platform that, at the rear end, comprises a structural frame as supporting means for arms that project rearward on which are secured wheel rims resting on the ground, and comprising at the front end a structural frame with arms projecting forward on which is secured a drawbar secured to a tractor or other vehicle and an arm connected to the power take-off of the tractor is secured in the upper part of said structural frame; a supporting base, which can slide through the action of hydraulic elements, mounted on a pair of parallel rails that is arranged transversely on said platform and is adapted to receive supporting and securing means for a folding and extending head structure for cutting the tips off the leafstalks of agave plants, which comprises a mechanism with lower pincers activated by hydraulic means that clasp the agave plant and close in order to bunch said leafstalks and to cut the tips by means of an upper pincer provided with cutting blades; said head comprising a hydraulic mechanism and system for adjusting different heights and closure diameter of the pincer system in order to cover different sizes of plants; the machine includes a hydraulic system with control buttons or levers and operator actuation for actuation of the multiple actuators and mechanisms.

In the preferred embodiment of the invention, a lateral end of said slideable supporting base comprises a pivoting securing means where a lower portion of the folding and extending cutting head structure is pivotably secured and wherein said supporting and securing means for said folding and extending head structure comprise a vertical post with diagonal reinforcement arms, at the upper end of which is secured a hydraulic actuator in which the end of the extending rod is secured in an upper portion of the folding cutting head structure; said cutting head structure being folded in the rest state in a side-on position on said slideable supporting base centered on the platform and in its operating state said supporting base slides on the pair of rails in order to be separated and to project laterally from the platform, and wherein the hydraulic actuator extends by unfolding the cutting head structure, the latter being caused to turn in order to be positioned horizontally.

Said chassis, in one of the embodiments thereof, comprises a lateral stabilizer arm that at its end comprises a wheel resting on the ground that is folded up or extended through the action of a hydraulic actuator secured to the chassis and at the end of said lateral stabilizer arm.

In the preferred embodiment of the invention, said cutting head structure comprises a vertical plate that on its front face defines two vertical sliding skids on which the pincer mechanism is slideably mounted, which is height-adjustable, i.e. it rises or falls as a function of requirements and of the size of the plants through the action of actuating elements for the vertical movement thereof.

Said pincer mechanism comprises supporting and securing means for said pincers that are secured in a mutually separated vertical arrangement; each pincer being composed of two movable arms joined pivotably to said supporting and securing means; wherein each movable arm comprises a first section of substantially curved form and a second, end section that is substantially rectilinear ending in a point; respective securing frames of hydraulic actuators of each arm of said pincers project rearward from said supporting and securing means, on which said hydraulic actuators are secured, the extending rods of which are secured to the first, curved section of each movable arm of the pincers in order to close or to open same.

In the preferred embodiment of the invention, each arm of each pincer is formed by two attached plates and a substantially curved plate secured to the internal face of both plates in order to define a greater surface of contact of the pincers with the leafstalks of the agave plants. And wherein, preferably, the two arms of each pincer are partially offset in terms of height in order, upon closure, to leave one slightly above the other and to be able to define firm closure and greater pressure on the agave leafstalks.

In the preferred embodiment of the invention, the upper pincer provided with cutting blades is formed by two short movable curved arms joined pivotably to said supporting and securing means, and on the internal face thereof they comprise, in a secure manner, a semicircular blade with a sharp outer edge and upon closure of the pincer said blades cut the tips off the agave leafstalks. Said movable curved arms of said upper pincer provided with cutting blades likewise comprise hydraulic actuators secured to the rear frames for securing to the head in order to close or to open same.

In the preferred embodiment of the invention, said upper pincer provided with cutting blades comprises actuating means for the vertical movement thereof and to adjust the cutting height of the tips of the agave leafstalks.

In order better to understand the features of the invention, the present description is accompanied, as an integral part thereof, by non-limiting, illustrative drawings that are described below.

BRIEF DESCRIPTION OF THE FIGURES

FIGS. 7a, 7b, and 7c illustrate a conventional perspective, a top view and a front view, respectively, of the folding and extending head structure for cutting the tips off the leafstalks of agave plants of the machine of the present invention.

DETAILED DESCRIPTION OF THE INVENTION

The characteristic details of the machine for cutting off the tips of the leafstalks of agave plants and preparing the plants for subsequent core removal are shown clearly in the following description and in the illustrative drawings appended hereto, the same reference signs being used to indicate the same parts.

Figure 1:
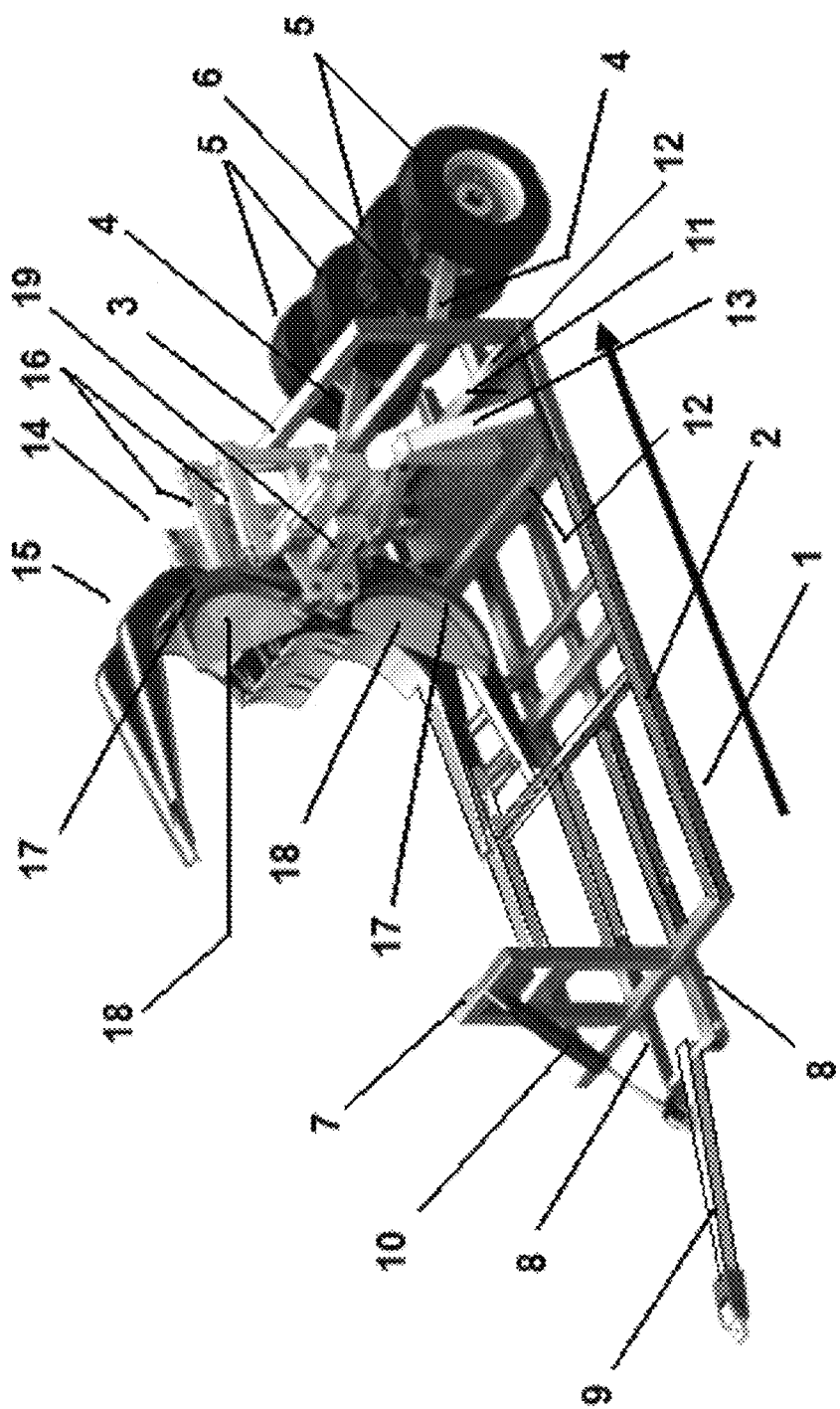
FIG. 1 shows a conventional perspective view of the machine for cutting the tips off the leafstalks of agave plants and preparing the plants for core removal, according to the present invention.

With reference to FIG. 1, which shows a conventional perspective view of the machine for cutting the tips off the leafstalks of agave plants and preparing the plants for core removal, according to the present invention. Said figure shows the machine that comprises a chassis 1 defining a substantially horizontal platform 2 that, at the rear, comprises a structural frame 3 as supporting means for arms that project rearward 4 on which are secured wheel rims, of said chassis 1, resting on the ground 5, with damping means 6; said platform comprising at the front end a structural frame 7 with arms projecting forward 8 on which is secured a drawbar 9 secured to a tractor or other vehicle and an arm 10 connected to the power take-off of the tractor is secured in the upper part of said structural frame 7. A supporting base 11, which can slide through the action of hydraulic elements (not shown), mounted on a pair of parallel rails 12, is arranged transversely on said platform 2 and is adapted to receive supporting and securing means 13 for a folding and extending head structure 14 for cutting the tips off the leafstalks of agave plants, which comprises a mechanism with lower pincers 15 activated by hydraulic means 16 that clasp the agave plant and close in order to bunch said leafstalks and to cut the tips by means of an upper pincer 17 provided with cutting blades 18; said head 14 comprising a hydraulic mechanism and system 19 for adjusting different heights and closure diameter of the pincer system in order to cover different sizes of plants; the machine includes a hydraulic system with control buttons or levers and actuation (not shown) controlled by the operator for actuation of the multiple actuators and mechanisms.

Figure 2:
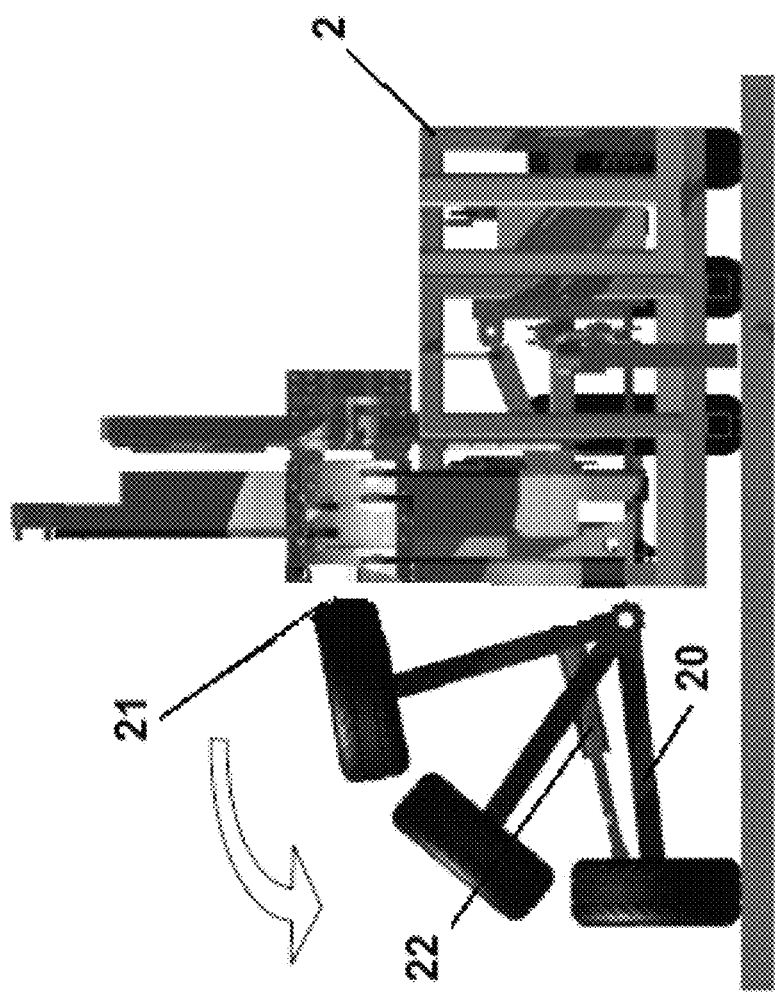
FIG. 2 illustrates a front view of the machine for cutting the tips off the leafstalks of agave plants and preparing the plants for core removal, showing the extension of the lateral stabilizer.

With reference to FIG. 2, which illustrates a front view of the machine for cutting the tips off the leafstalks of agave plants and preparing the plants for core removal, showing the extension of the lateral stabilizer. Said figure shows that the chassis 1 comprises a lateral stabilizer arm 20 that, at the end thereof, comprises a wheel 21 for resting on the ground and which folds up or extends through the action of a hydraulic actuator 22 secured to the chassis and to the end of said lateral stabilizer arm; said arm offers a rest and support to prevent overturning or damage to the equipment.

Figure 3:
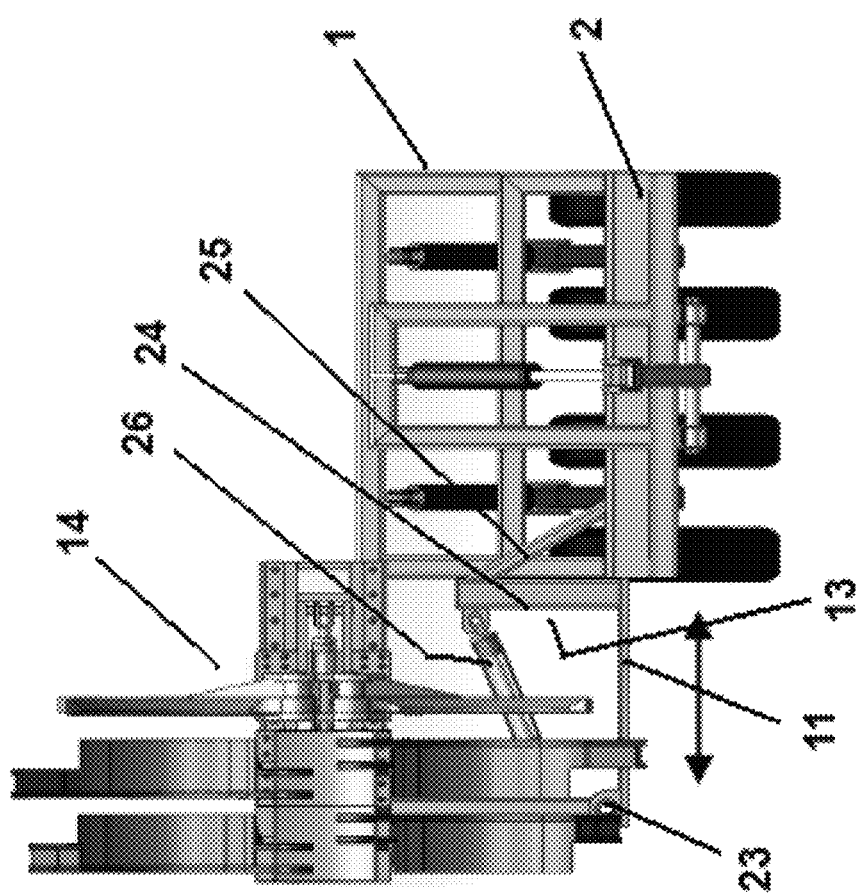
FIG. 3 illustrates a front view of the machine for cutting the tips off the leafstalks of agave plants and preparing the plants for core removal, showing the lateral movement of the slideable supporting base of the folding and extending head structure for cutting the tips off the leafstalks of agave plants.

FIG. 3 shows that the lateral end of said slideable supporting base 11 comprises a pivoting securing means 23 where a lower portion of the folding and extending cutting head structure 14 is pivotably secured and wherein said supporting and securing means 13 for said folding and extending head structure 14 comprise a vertical post 24 with diagonal reinforcement arms 25, at the upper end of which is secured a hydraulic actuator 26 in which the end of the extending rod is secured in an upper portion of the folding cutting head structure 14; said cutting head structure 14 being folded in the rest state in a side-on position on said slideable supporting base 11 centered on the platform 2 (see FIG. 1) and in its operating state said supporting base 11 slides on the pair of rails 12 in order to be separated and to project laterally from the platform 2.

Figure 4:
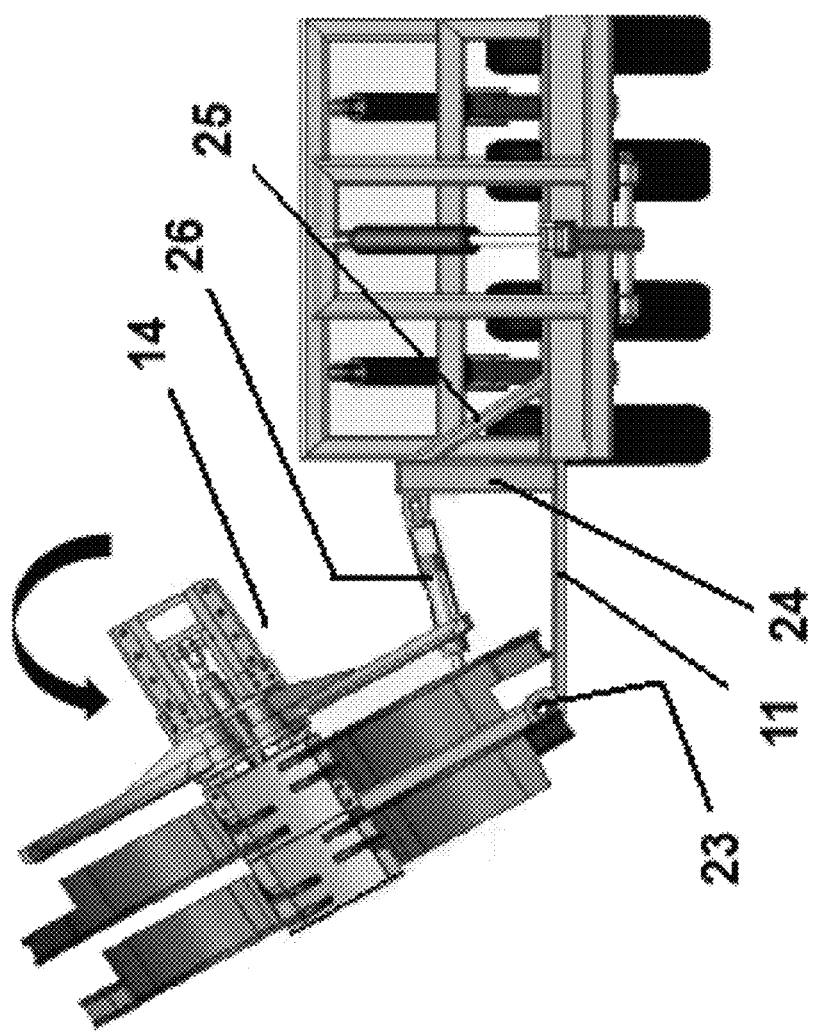
FIG. 4 illustrates a front view of the machine for cutting the tips off the leafstalks of agave plants and preparing the plants for core removal, showing the extension and turning of the head structure for cutting the tips off the leafstalks of agave plants.

FIG. 4 shows that said hydraulic actuator 26 secured to the upper end of said vertical post 24 of the supporting and securing means 13 of said folding and extending cutting head structure 14 extends by unfolding the cutting head structure 14, the latter being caused to turn in order to be positioned horizontally.

Figure 5:
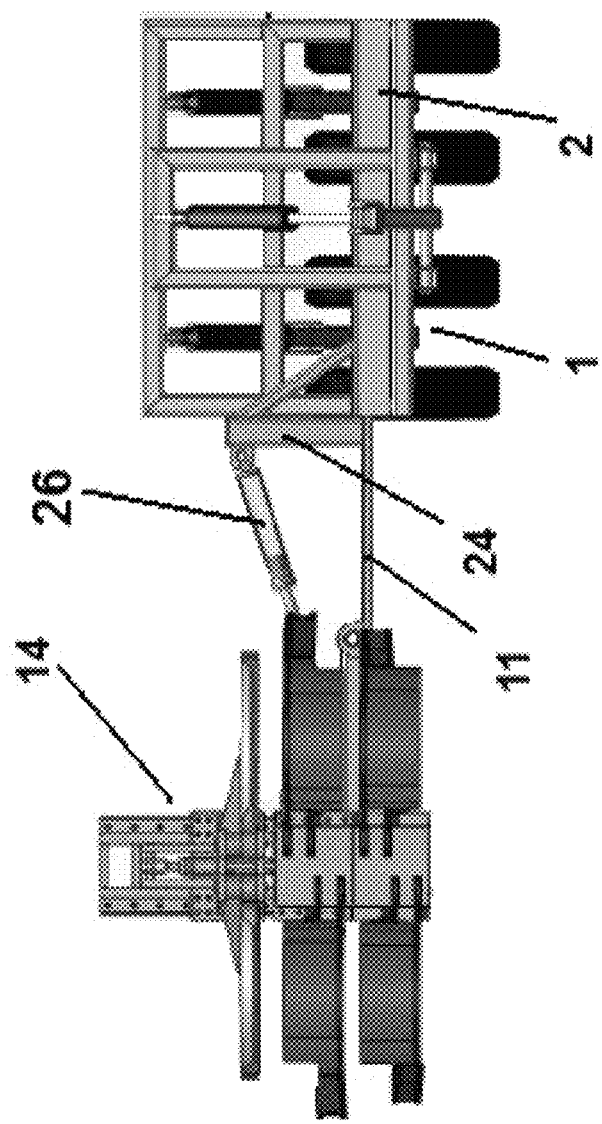
FIG. 5 illustrates a front view of the machine for cutting the tips off the leafstalks of agave plants and preparing the plants for core removal, showing the head structure for cutting the agave tips positioned horizontally, ready to operate.
Figure 6:
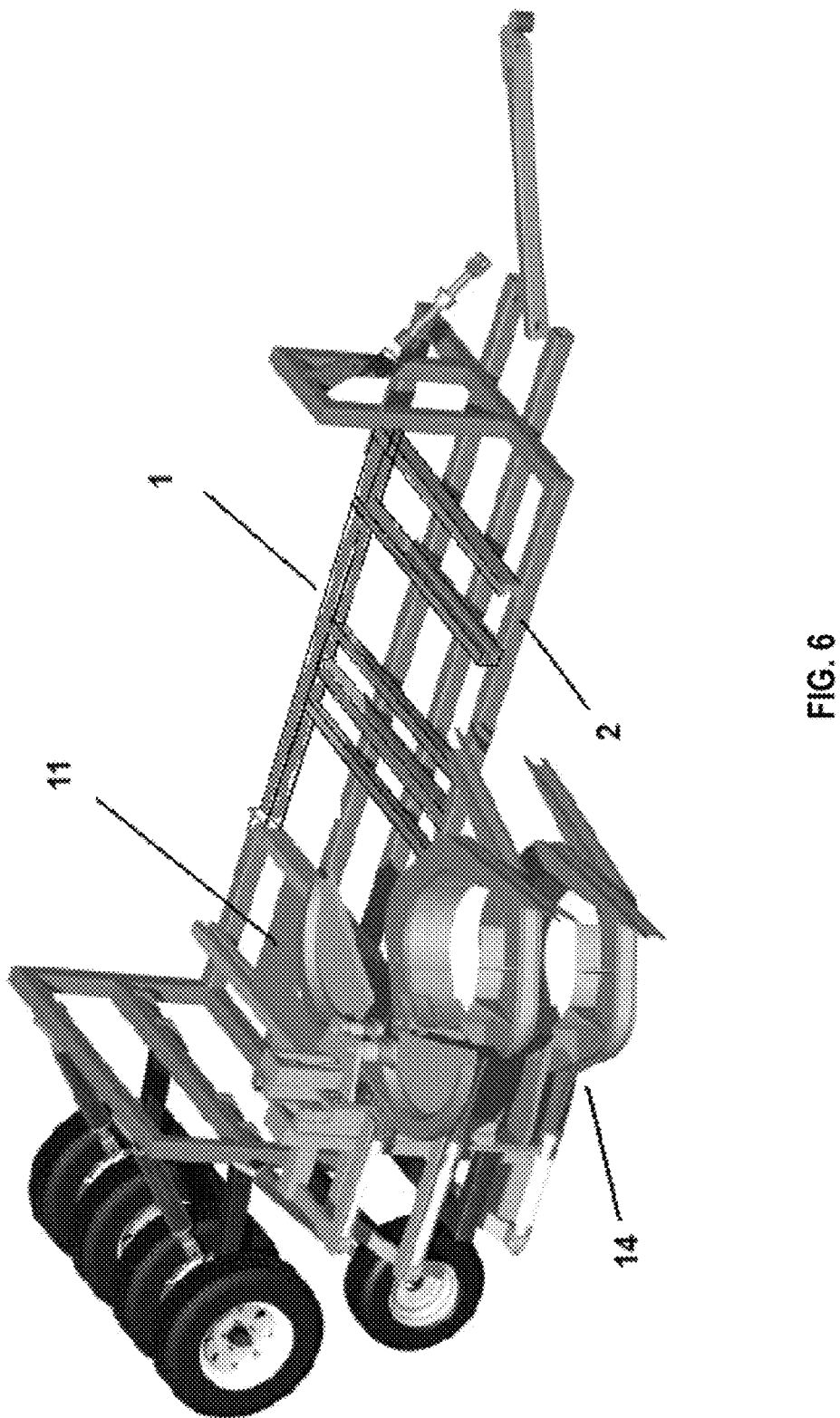
FIG. 6 illustrates a lateral perspective view of the machine for cutting the tips off the leafstalks of agave plants and preparing the plants for core removal, showing the head structure for cutting the agave tips positioned horizontally, ready to operate.

FIGS. 5 and 6 make it possible to see that said folding and extending cutting head structure 14 is in a fully horizontal position upon full extension of the hydraulic actuator 26 secured to the upper end of said vertical post 24 of the supporting and securing means for said folding and extending cutting head structure 14.

Figure 7A:
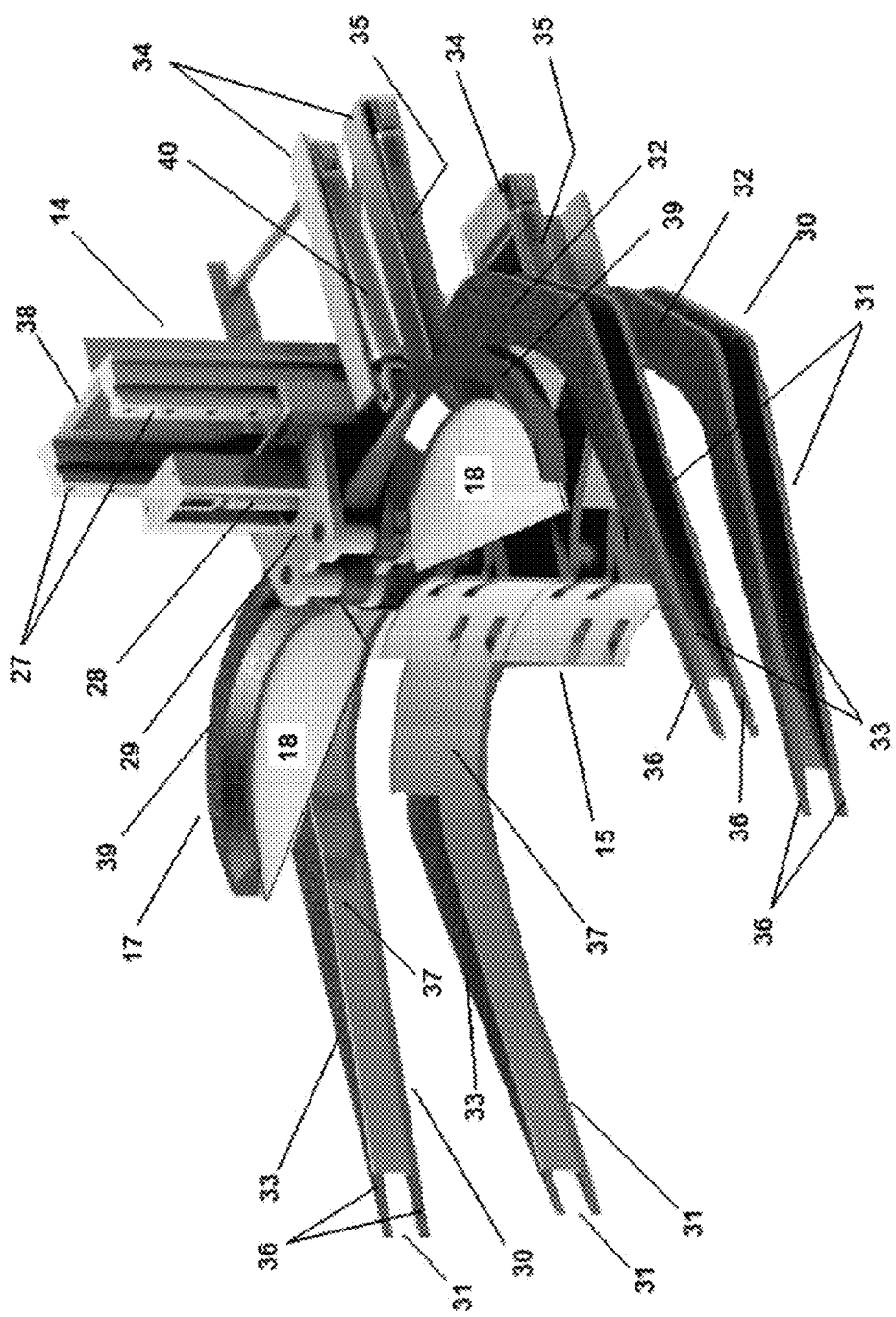
Figure 7C:
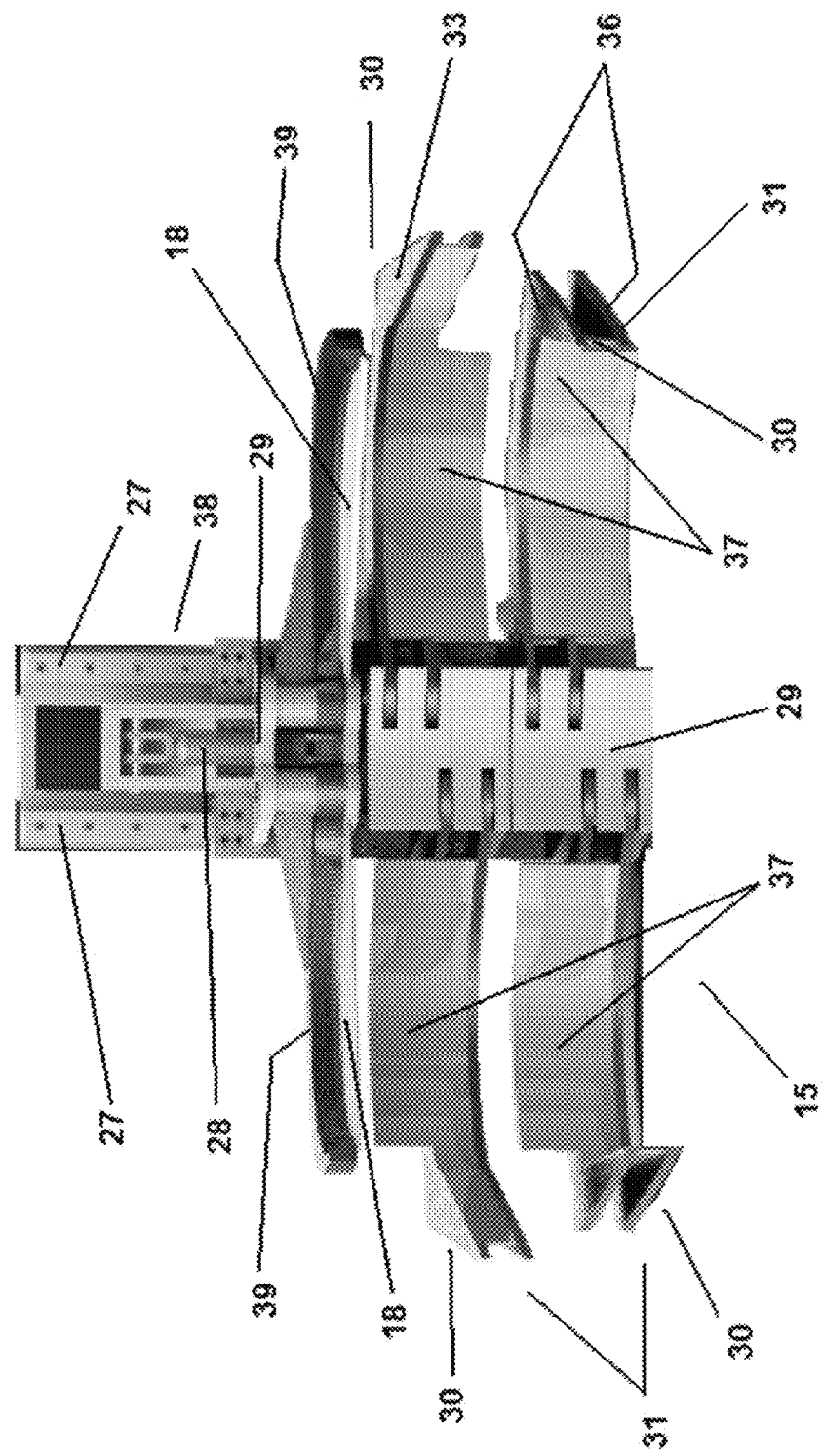

With reference to FIGS. 7a, 7b, and 7c, which illustrate a conventional perspective, a top view and a front view, respectively, of the folding and extending head structure for cutting the tips off the leafstalks of agave plants of the machine of the present invention. Said figures show the structural form of the folding and extending cutting head 14 that comprises a vertical plate 38 that on its front face defines two vertical sliding skids 27 on which the lower pincer mechanism 15 is slideably mounted, which is height adjustable, i.e. it rises or falls as a function of requirements and of the size of the plants through the action of actuating elements 28 for the vertical movement thereof.

Said lower pincer mechanism 15 comprises supporting and securing means 29 for said pincers 30 that are secured in a mutually separated vertical arrangement; each pincer being composed of two movable arms 31 joined pivotably to said supporting and securing means 29; wherein each movable arm 31 comprises a first section of substantially curved form and a second, end section 33 that is substantially rectilinear ending in a point; respective securing frames 34 of hydraulic actuators 35 of each arm 31 of said pincers 30 project rearward from said supporting and securing means, on which said hydraulic actuators 35 are secured, the extending rods of which are secured to the first, curved section 32 of each movable arm 31 of the pincers in order to close or to open same.

Each movable arm 31 is formed by two attached plates 36 and a substantially curved plate 37 secured to the internal face of both attached plates 36 in order to define a greater surface of contact of the pincers with the leafstalks of the agave plants. And wherein, preferably, the two arms of each pincer are partially offset in terms of height in order, upon closure, to leave one slightly above the other and to be able to define firm closure and greater pressure on the agave leafstalks.

The upper pincer 17 provided with semicircular cutting blades 18 is formed by two short movable curved arms 39 joined pivotably to said supporting means, and on the internal face thereof they comprise, in a secure manner, a semicircular blade 18 with a sharp outer edge and upon closure of the pincer said blades cut the tips off the agave leafstalks. Said short movable curved arms 39 of said upper pincer provided with semicircular cutting blades 18 likewise comprise hydraulic actuators secured to the rear frames 34 for securing to the folding and extending cutting head 14 in order to close or to open same.

Figure 8A:
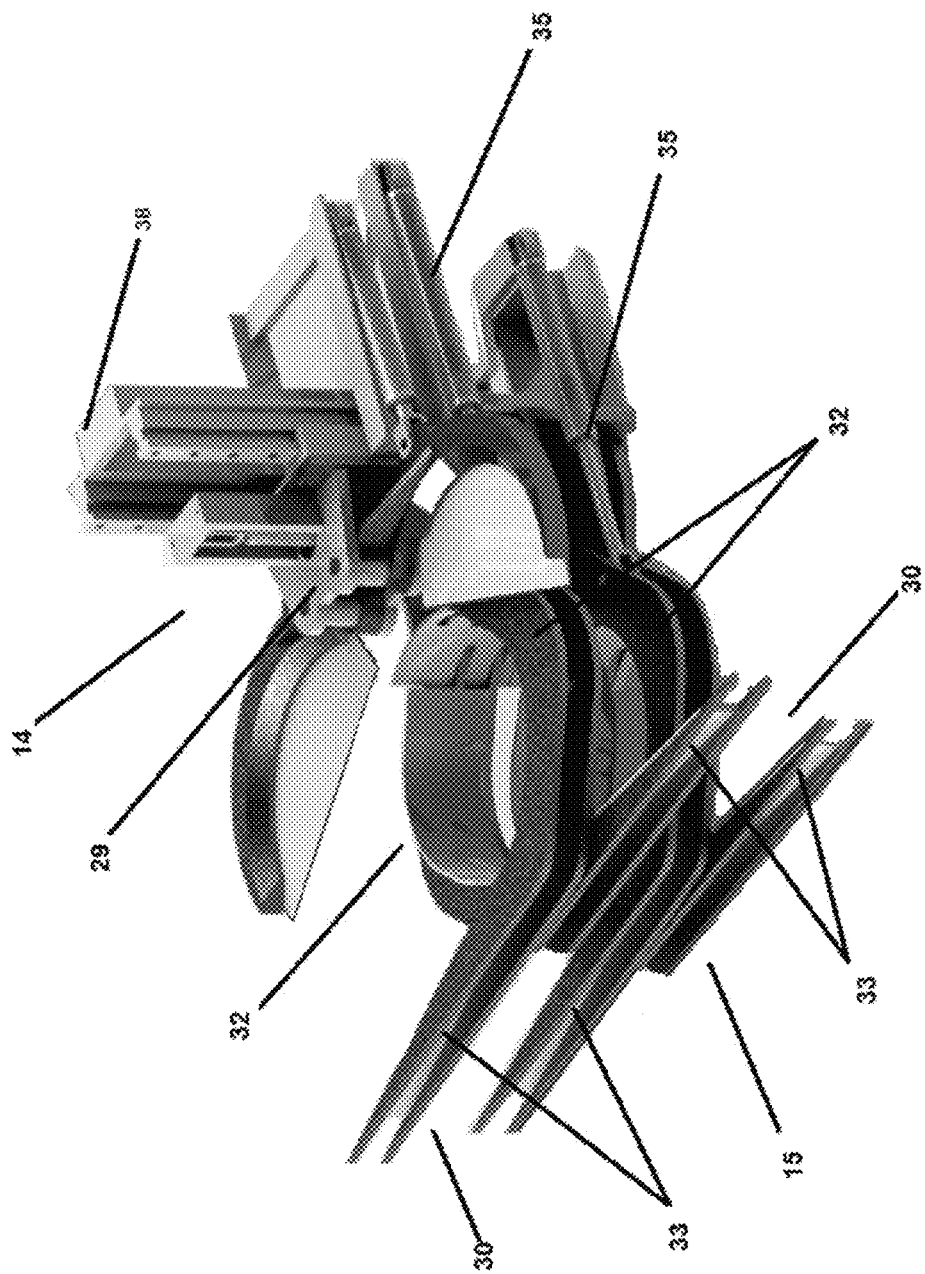
FIGS. 8a, 8b, and 8c illustrate a conventional perspective, a top view and a front view, respectively, of the folding and extending head structure for cutting the tips off the leafstalks of agave plants of the machine of the present invention; illustrating the closure of the lower pincers activated by hydraulic means that clasp the agave plant and close in order to bring them together.
Figure 8B:
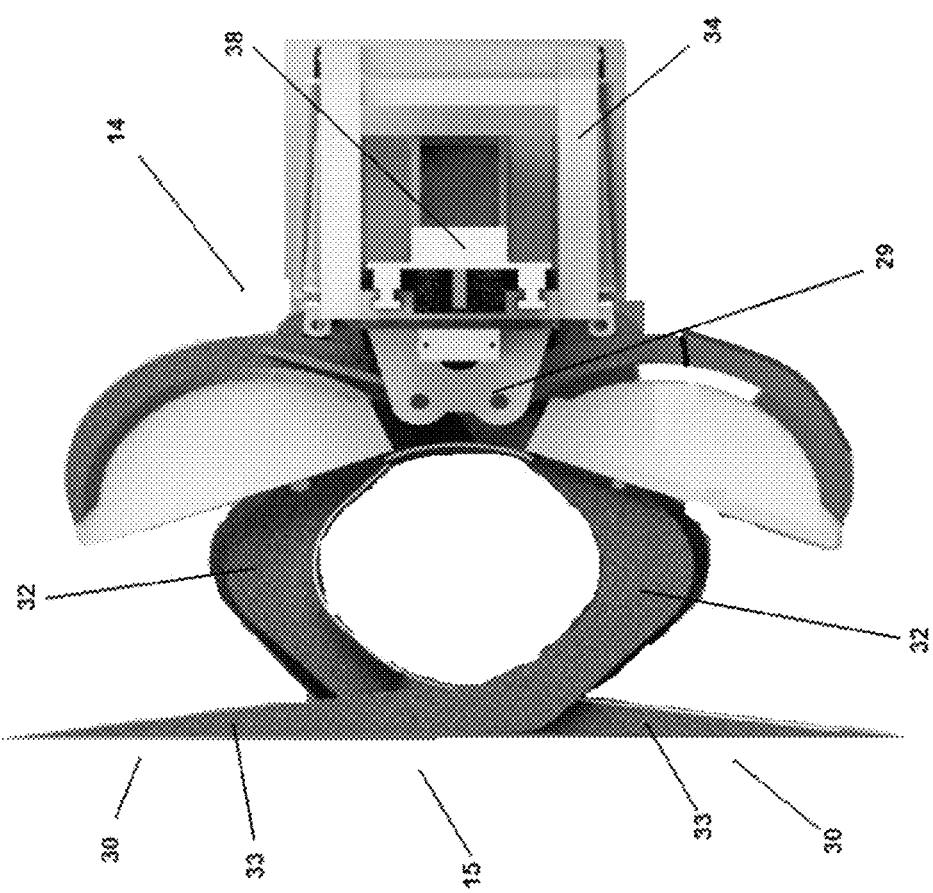
Figure 8C:
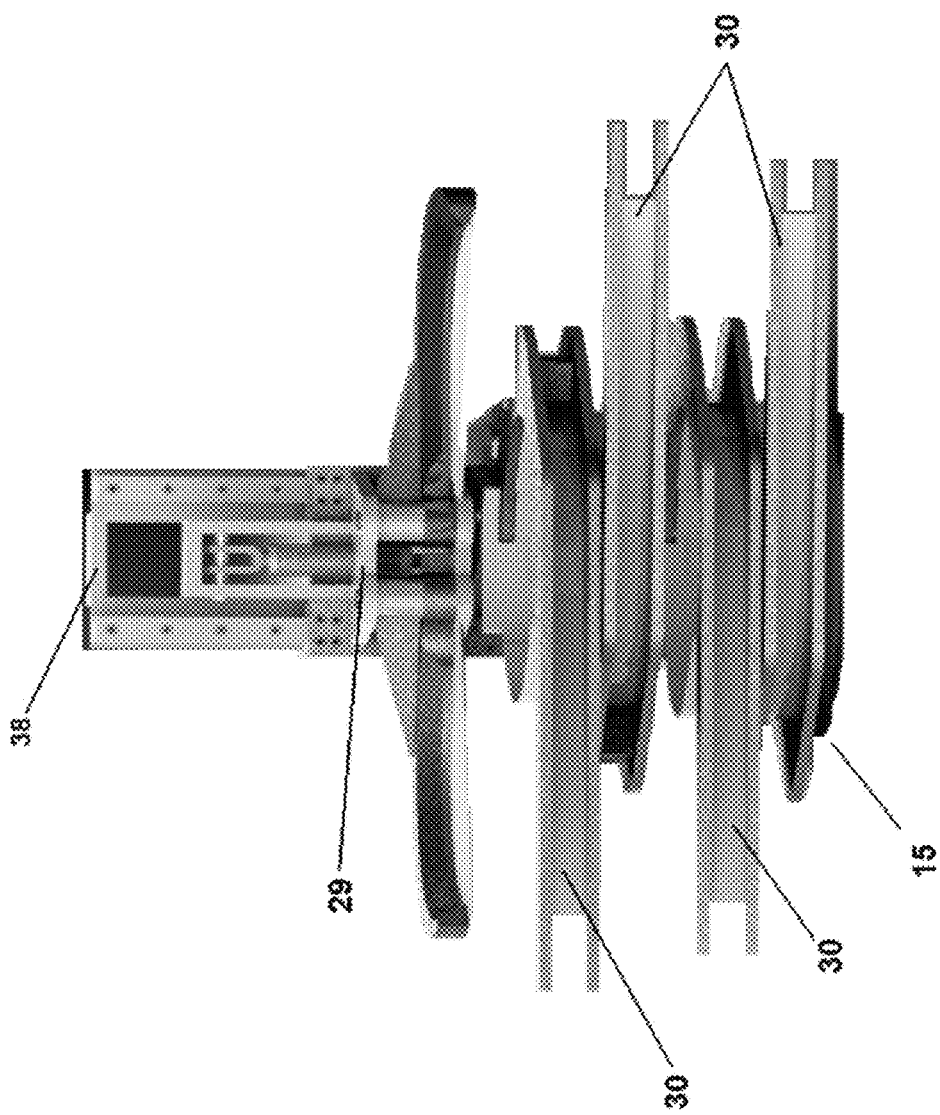

FIGS. 8a, 8b, and 8c illustrate a conventional perspective, a top view and a front view, respectively, of the folding and extending head structure for cutting the tips off the leafstalks of agave plants of the machine of the present invention; illustrating the closure of the pincers 30 of the system of lower pincers 15 activated by the hydraulic actuators 35 that clasp the agave plant and close in order to bring them together. It will be observed that upon closure of the pincers 30, the curved section 32 defines an internal space where the plant is located and, upon closure of said pincers 30, the leafstalks of the agave plants are pressed in order to bunch them as much as possible; the substantially rectilinear end sections 33 offer resistance and greater pressure toward the interior where the agave plant is located.

Figure 9A:
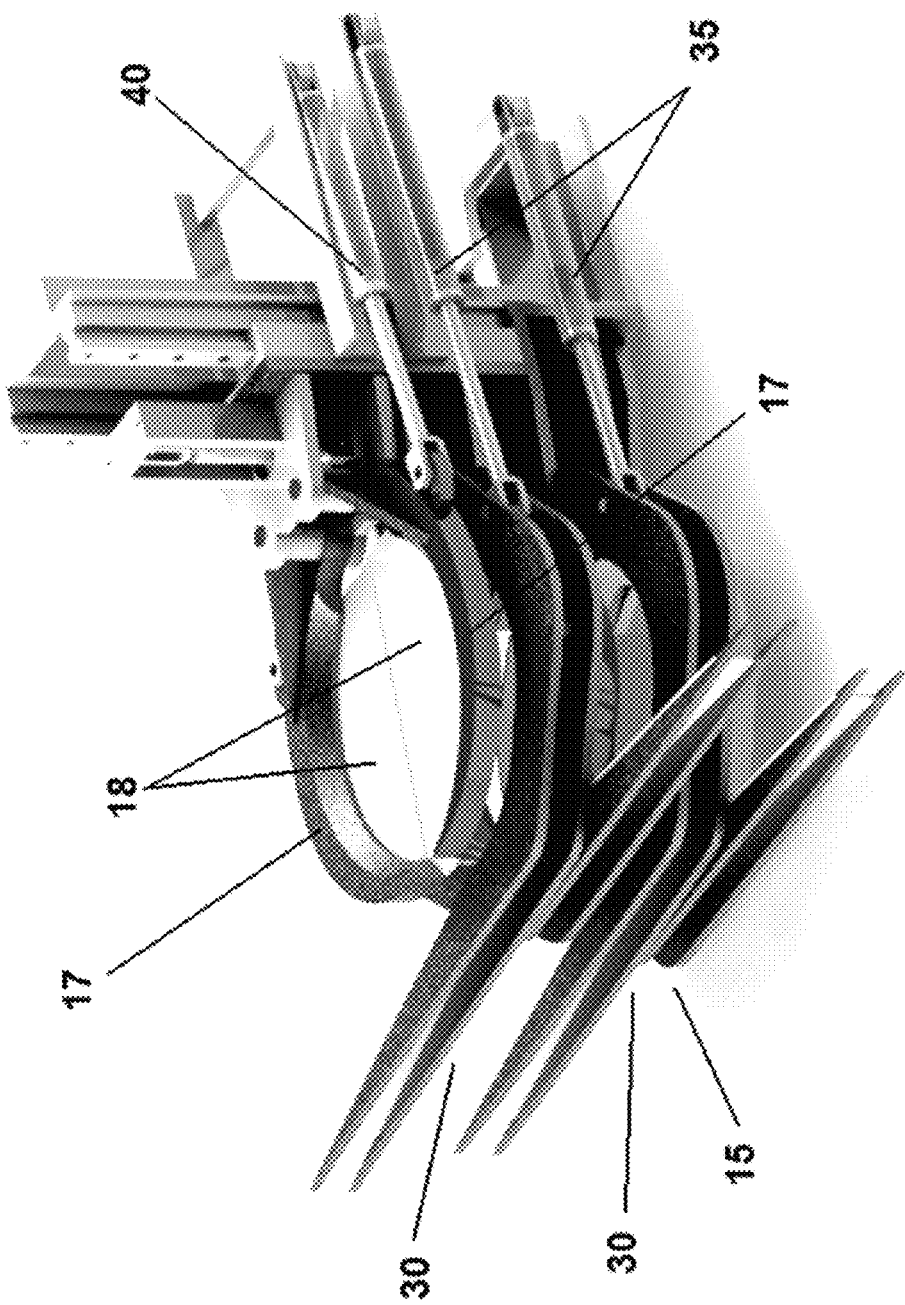
FIGS. 9a and 9b illustrate a conventional perspective and a top view, respectively, of the folding and extending head structure for cutting the tips off the leafstalks of agave plants of the machine of the present invention; illustrating the closure of the lower pincers activated by hydraulic means that clasp the agave plant and close in order to bring them together, and also the closure of the upper pincer provided with cutting blades for cutting the tip of the leafstalks of the agave plants.
Figure 9B:
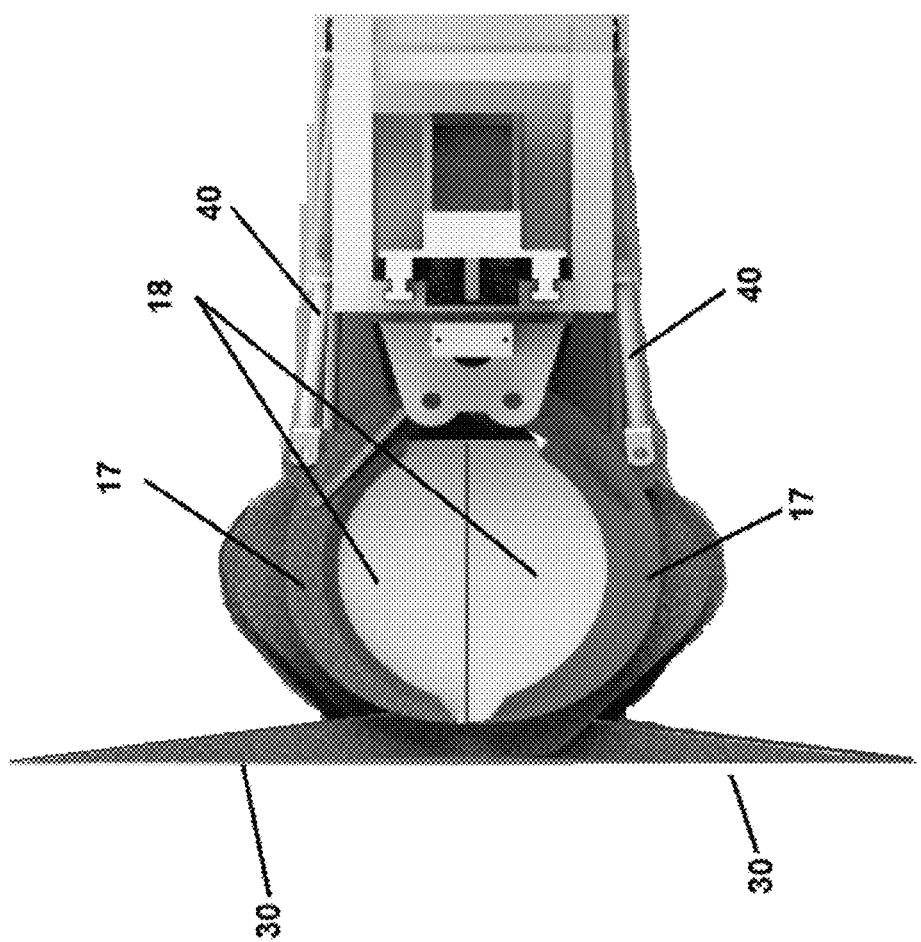

With reference to FIGS. 9a and 9b, it is illustrated that once the pincers 30 are closed, as illustrated in FIGS. 8a, 8b, and 8c, activated by the hydraulic actuators 35 that clasp the agave plant and close in order to bring them together, the upper pincer 17 with semicircular cutting blades 18 is actuated by the hydraulic actuators 40 and they close in order to cut the tip of the leafstalks of the agave plants.

Figure 10:
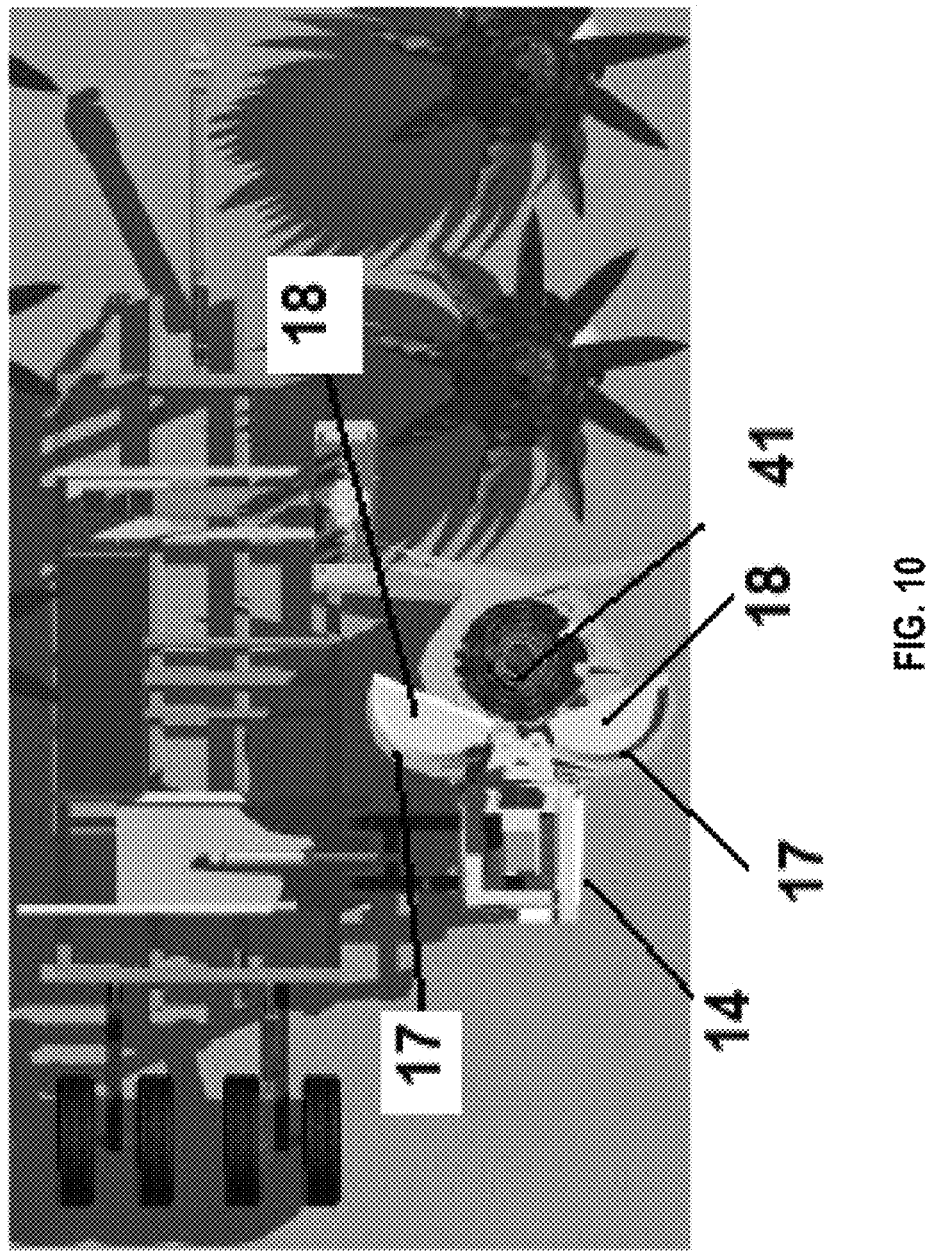
FIG. 10 illustrates a top view of the machine for cutting the tips off the leafstalks of agave plants and preparing the plants for subsequent core removal, at the point in the operation when it is clasping and cutting the tips of the agave leafstalks.
Figure 11:
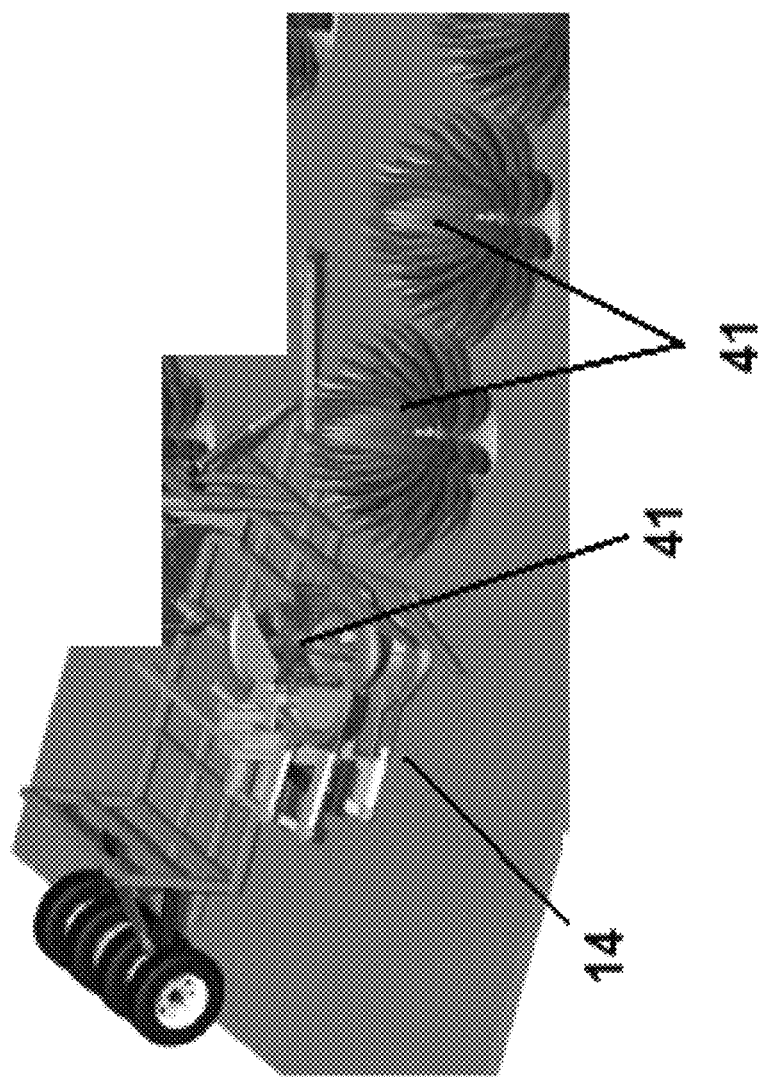
FIG. 11 illustrates a conventional perspective of the machine for cutting the tips off the leafstalks of agave plants and preparing the plants for subsequent core removal, at the point in the operation when it is clasping and cutting the tips of the agave leafstalks. For a better understanding of the invention, a detailed description will now be given of one of the embodiments thereof, shown in the drawings attached to the present description for non-limiting, illustrative purposes.

FIGS. 10 and 11 illustrate a top view and a conventional perspective of the machine for cutting the tips off the leafstalks of agave plants and preparing the plants for subsequent core removal, at the point in the operation when it is clasping and cutting the tips of the agave leafstalks 41, as described and illustrated in FIGS. 8*a* to 9*b*.

The invention has been sufficiently described for a person with average knowledge in the field to be able to reproduce and to obtain the results mentioned in the present invention. However, any person skilled in the technical field of the present invention may be capable of making modifications not described in the present application, but if, for the purposes of applying these modifications to a specific structure or in the process for manufacturing the invention, the subject matter claimed in the following claims is required, said structures will have to be included within the scope of the invention.

The invention claimed is:

1. A machine for cutting the tips off the leafstalks of agave plants and preparing the plants for subsequent core removal, wherein the machine comprises:
   a chassis defining a platform with a rear end, having a structural frame supporting arms that project rearward having wheel rims pivotably secured thereto for resting on the ground, the chassis having at the front end a structural frame with arms projecting forward on which is secured a drawbar to be secured to a tractor, and an arm connectable to the power take-off of the tractor is secured to an upper part of said structural frame;
   a supporting base, which can slide through the action of hydraulic elements, mounted on a pair of parallel rails that is arranged transversely on said platform and is adapted to receive a supporting and securing member for a folding and extending head structure for cutting the tips off the leafstalks of agave plants, which comprises a mechanism with lower pincers activated by an hydraulic actuator that clasps the agave plant and closes in order to bunch said leafstalks and to cut the tips with an upper pincer provided with cutting blades;
   wherein said head structure comprises a hydraulic mechanism and system for adjusting the heights and closure diameter of the pincer system in order to accept different sizes of plants; and
   a hydraulic system with control buttons or levers for operator actuation of the hydraulic actuators and hydraulic elements.

2. The machine for cutting the tips off the leafstalks of agave plants and preparing the plants for subsequent core removal as claimed in claim 1, further comprising a damper extending between the arms projecting rearward on which are secured wheel rims resting on the ground and the upper part of said rear structural frame of the chassis to dampen the relative movement therebetween.

3. The machine for cutting the tips off the leafstalks of agave plants and preparing the plants for subsequent core removal as claimed in claim 1, wherein a lateral end of said slideable supporting base comprises a pivoting securing means where a lower portion of the folding and extending cutting head structure is pivotably secured and wherein said supporting and securing means for said folding and extending head structure comprise a vertical post with diagonal reinforcement arms, an upper end of the diagonal reinforcement arms secured to a hydraulic actuator where an end of a rod extending rod from the hydraulic actuator is secured in an upper portion of the folding cutting head structure.

4. The machine for cutting the tips off the leafstalks of agave plants and preparing the plants for subsequent core removal as claimed in claim 1, wherein said cutting head structure when folded in the rest state is arranged in a side-on position on said slideable supporting base centered on the platform, and when in an operating state, said supporting base being slid on said pair of rails in order to be separated and to project laterally from the platform, and wherein the hydraulic actuator extends by unfolding the cutting head structure, the cutting head structure being caused to turn in order to be positioned horizontally.

5. The machine for cutting the tips off the leafstalks of agave plants and preparing the plants for subsequent core removal as claimed in claim 1, wherein said chassis further comprises a lateral stabilizer arm having an end supporting a wheel for resting on the ground that is folded up or extended through action of a hydraulic actuator secured to the chassis, wherein the wheel at the end of said lateral stabilizer arm helps prevent overturning of the machine and damage thereto.

6. The machine for cutting the tips off the leafstalks of agave plants and preparing the plants for subsequent core removal as claimed in claim 1, wherein said cutting head structure comprises a vertical plate forming a front face which defines two vertical sliding skids on which the pincer mechanism is slideably mounted on a securing member to support and secure said pincers, which is height-adjustable, to rise and fall as a function of requirements and of the size of the plants through the action of hydraulic actuating elements for the vertical movement of the pincers and said supporting and securing the machine further comprising hydraulic actuators of each arm of said pincers for the actuation thereof connected to the rear respective securing frames.

7. The machine for cutting the tips off the leafstalks of agave plants and preparing the plants for subsequent core removal as claimed in claim 1, wherein said pincer mechanism comprises said securing member to support and secure said pincers that are secured in a mutually separated vertical arrangement; each pincer being composed of two movable arms joined pivotably to said supporting and securing means; the two arms of each pincer being partially offset in terms of height in order, upon closure, to leave one slightly above the other and to be able to define firm closure and greater pressure on the agave leafstalks.

8. The machine for cutting the tips off the leafstalks of agave plants and preparing the plants for subsequent core removal as claimed in claim 1, wherein each movable arm of said pincers comprises a first section of substantially curved form and a second, end section that is substantially rectilinear ending in a point; where extending rods of the hydraulic actuators are secured to the first, curved section of each movable arm of the pincers in order to close or to open them about the agave plant.

9. The machine for cutting the tips off the leafstalks of agave plants and preparing the plants for subsequent core removal as claimed in claim 1, wherein each arm of each pincer is formed by two attached plates and a substantially curved plate secured to an internal face of both plates in order to define a greater surface of contact of the pincers with the leafstalks of the agave plants.

10. The machine for cutting the tips off the leafstalks of agave plants and preparing the plants for subsequent core removal as claimed in claim 1, wherein the upper pincer provided with cutting blades is formed by two short movable curved arms joined pivotably to said supporting and securing means, the cutting blades having a semicircular shape with a sharp outer edge and upon closure of the pincer said blades cut the tips off the agave leafstalks; and wherein said movable curved arms of said upper pincer provided with cutting blades comprise hydraulic actuators secured to the rear frames for securing to the head structure in order to close or to open the blades about the agave plant.

\* \* \* \* \*